United States Patent [19]

Johnson

[11] Patent Number: 4,574,670
[45] Date of Patent: Mar. 11, 1986

[54] MULTIPLE ANGLE CUTTING APPARATUS

[75] Inventor: George W. Johnson, Smyrna, Ga.

[73] Assignee: Lockheed Corporation, Burbank, Calif.

[21] Appl. No.: 552,692

[22] Filed: Nov. 17, 1983

[51] Int. Cl.⁴ .................. B23D 45/14; B27B 5/20
[52] U.S. Cl. ................................ 83/409; 83/464; 83/471.3; 83/522; 83/581
[58] Field of Search ............ 83/471.3, 464, 581, 83/488, 409, 486.1, 522

[56] References Cited

U.S. PATENT DOCUMENTS

| | | | |
|---|---|---|---|
| 2,422,843 | 6/1947 | Mooradian | 83/471.3 |
| 3,263,544 | 8/1966 | Margolien | 83/464 X |
| 3,910,142 | 10/1975 | Jureit et al. | 83/471.3 X |
| 4,454,794 | 6/1984 | Thornton | 83/471.3 |

*Primary Examiner*—Donald R. Schran
*Attorney, Agent, or Firm*—Stanley L. Tate

[57] ABSTRACT

A compound angle disk cutting apparatus (11) comprises a stock feed and orienting mechanism (13) for feeding and orienting stock to be cut, a cut piece handling mechanism (15) for manipulating a workpiece cut from the stock, a cutting member (19) and a cutting member positioning mechanism (17). The various components of the apparatus (11) are configured such that any engagement of the cutting member (19) with a workpiece has a common center point of cut (21). The point of cut (21) is defined as the point of coincidence for the center of rotation of the stock workpiece, the center of vertical pivot of the cutting member (19), the center of horizontal pivot of the cutting member (19), the vertical-tiltable travel of the cutting member (19) as well as the transverse-rotatable travel of the cutting member (19).

5 Claims, 19 Drawing Figures

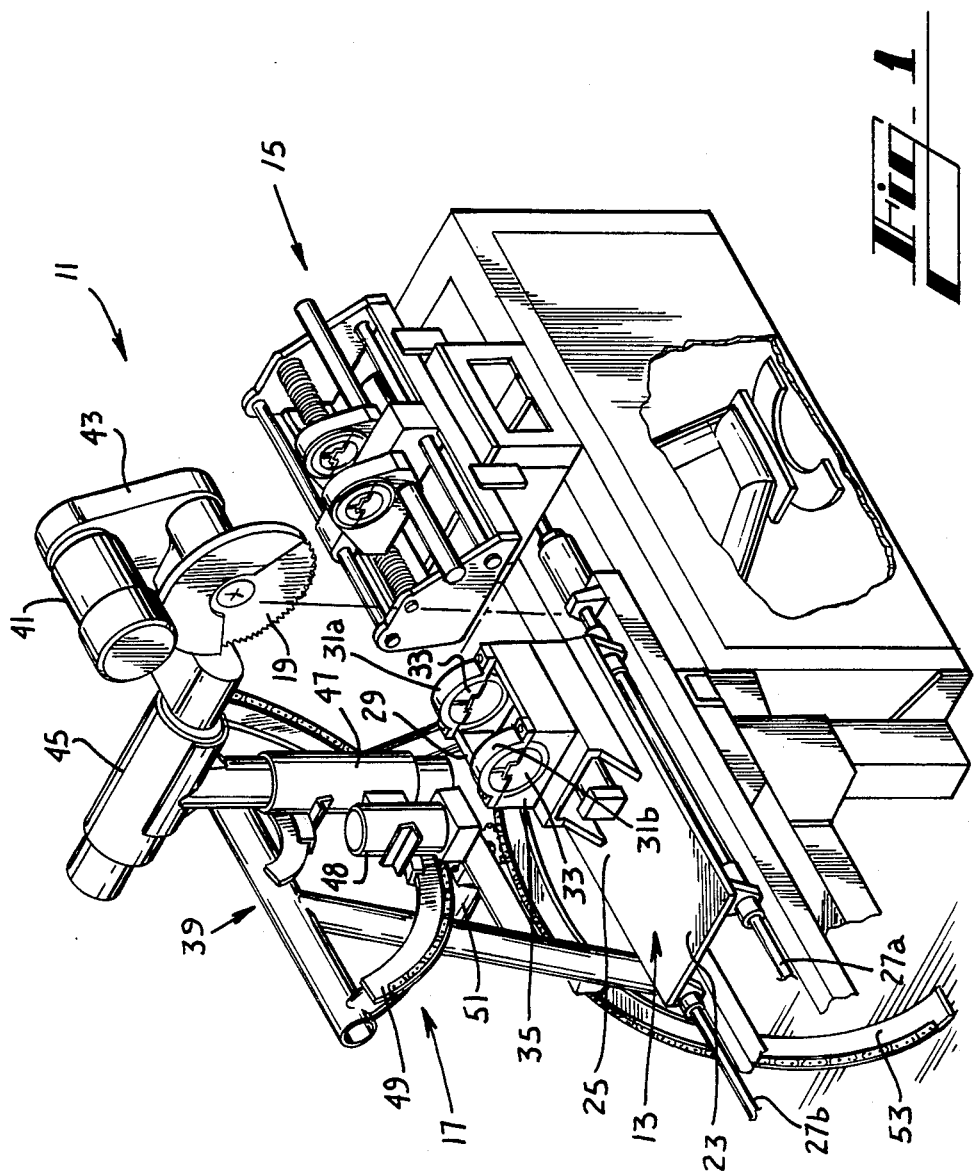

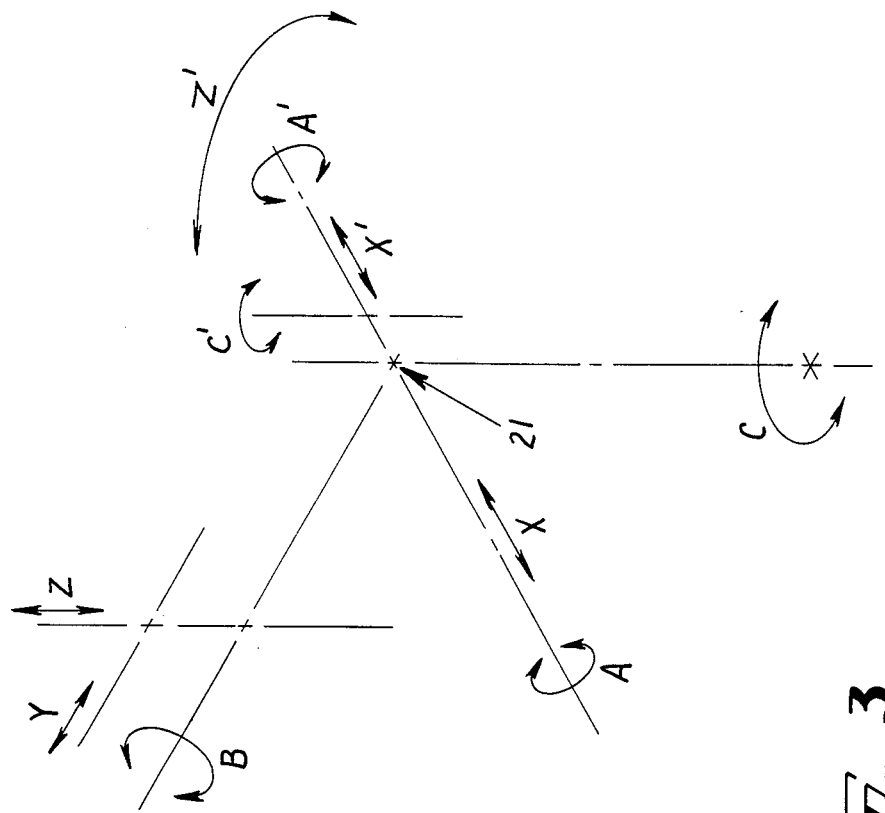
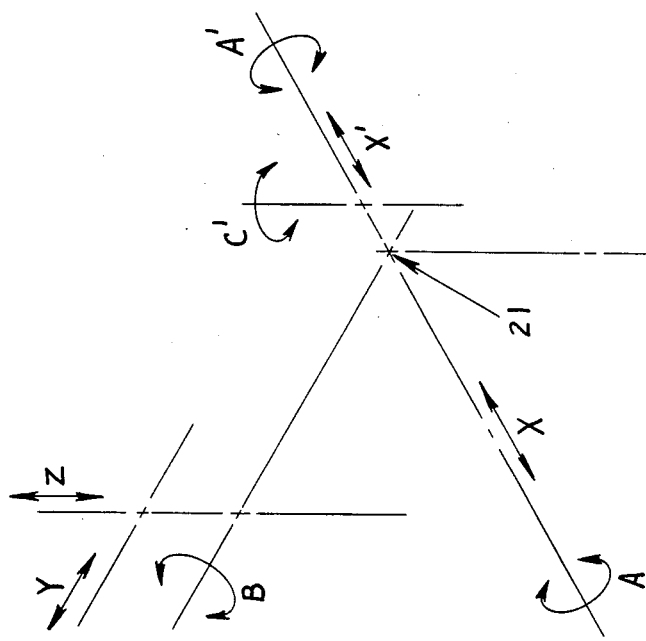
Fig-3
Fig-2

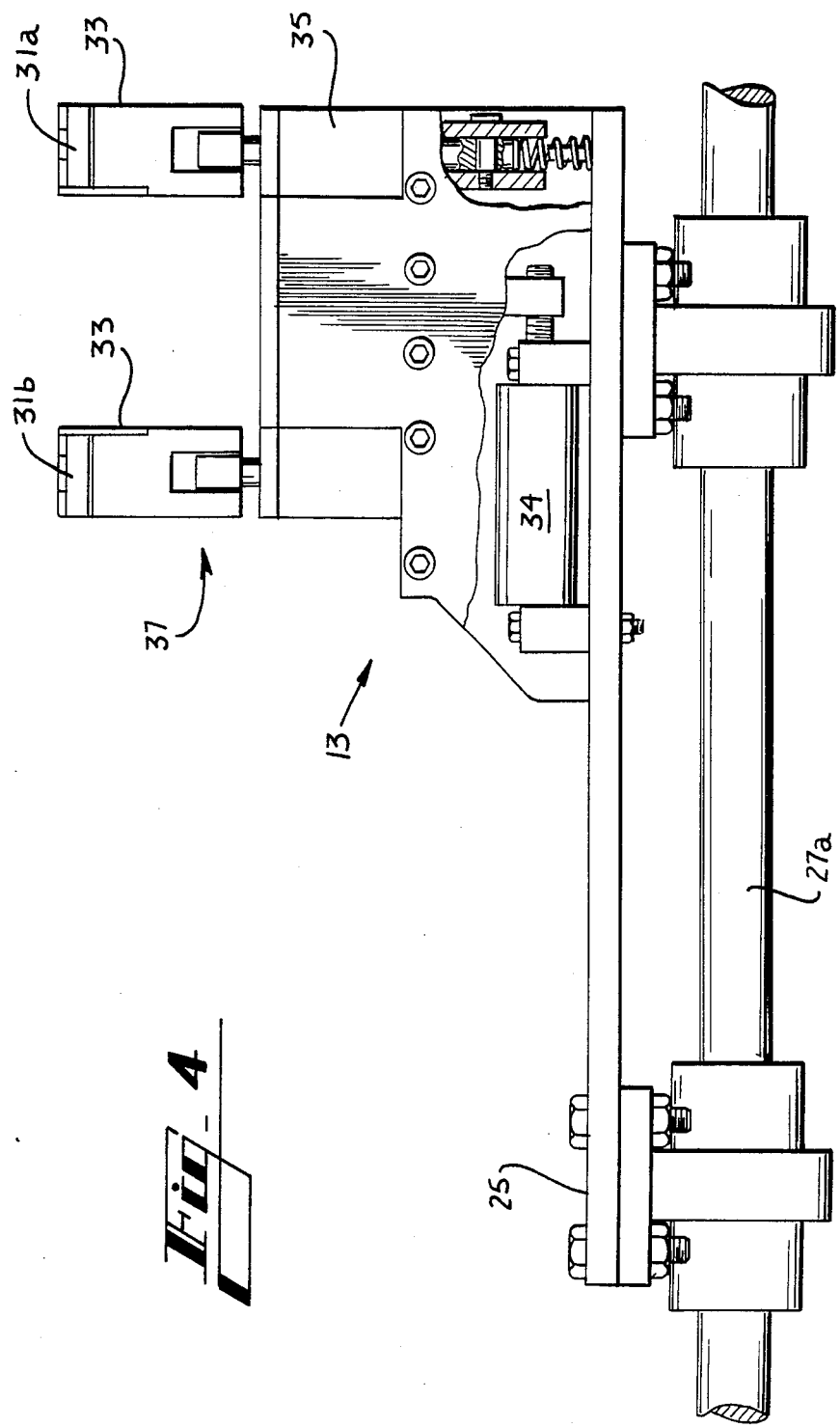

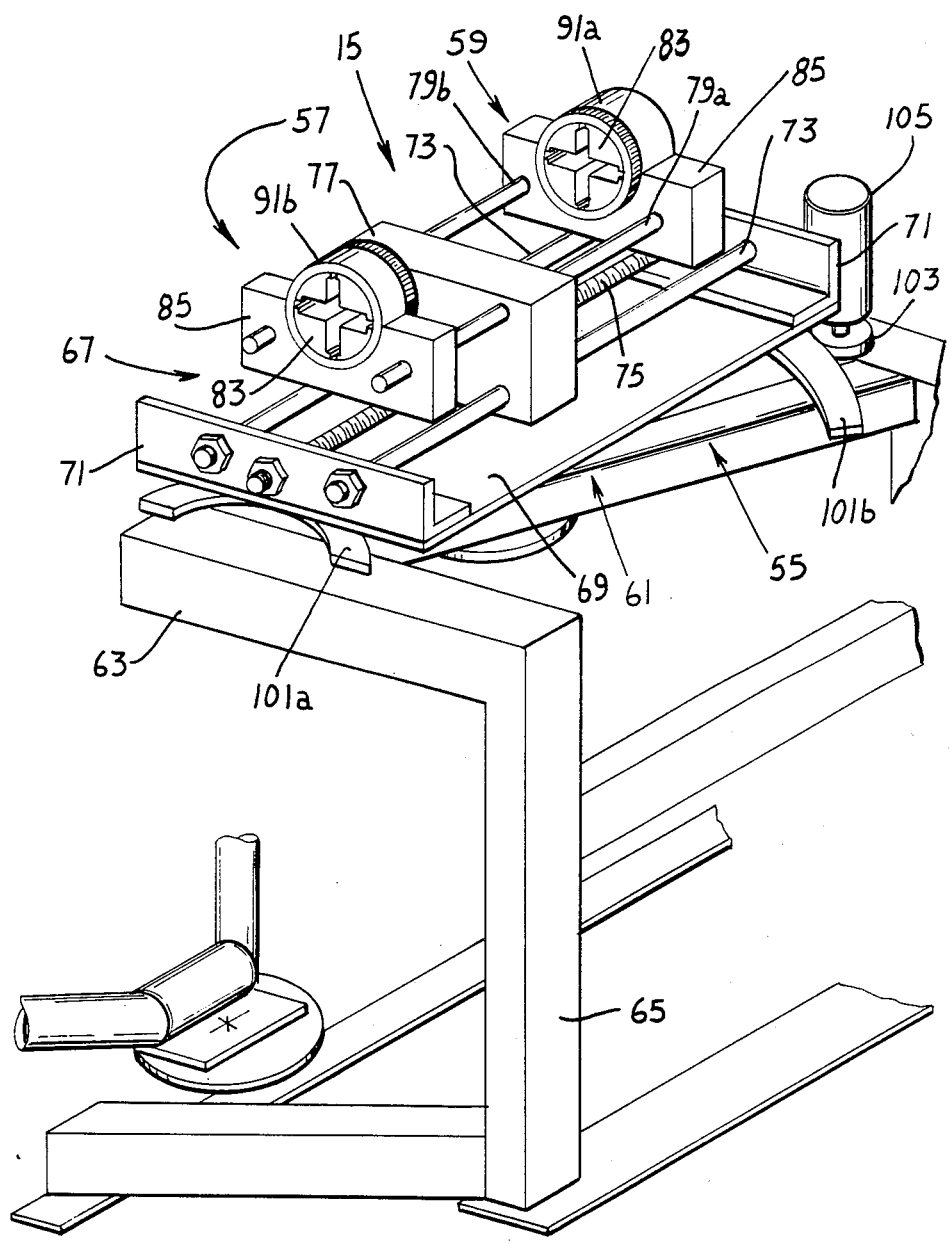
Fig_7

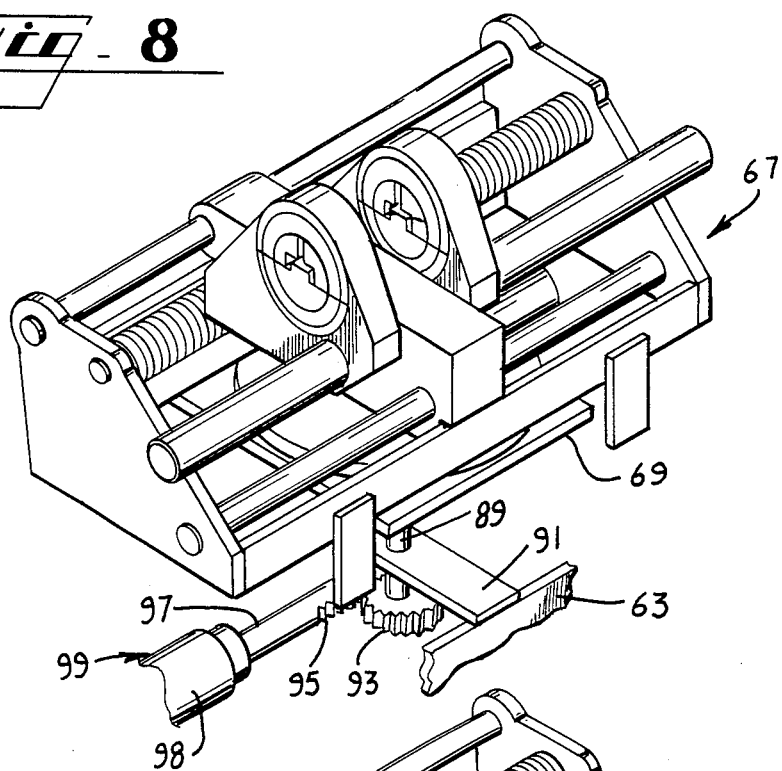
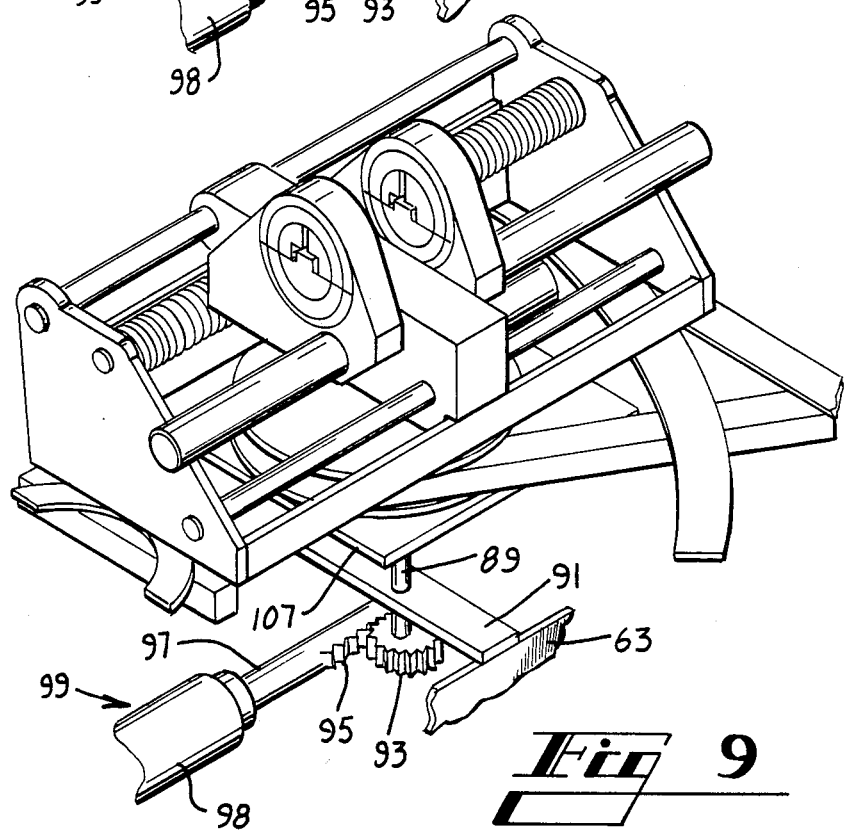

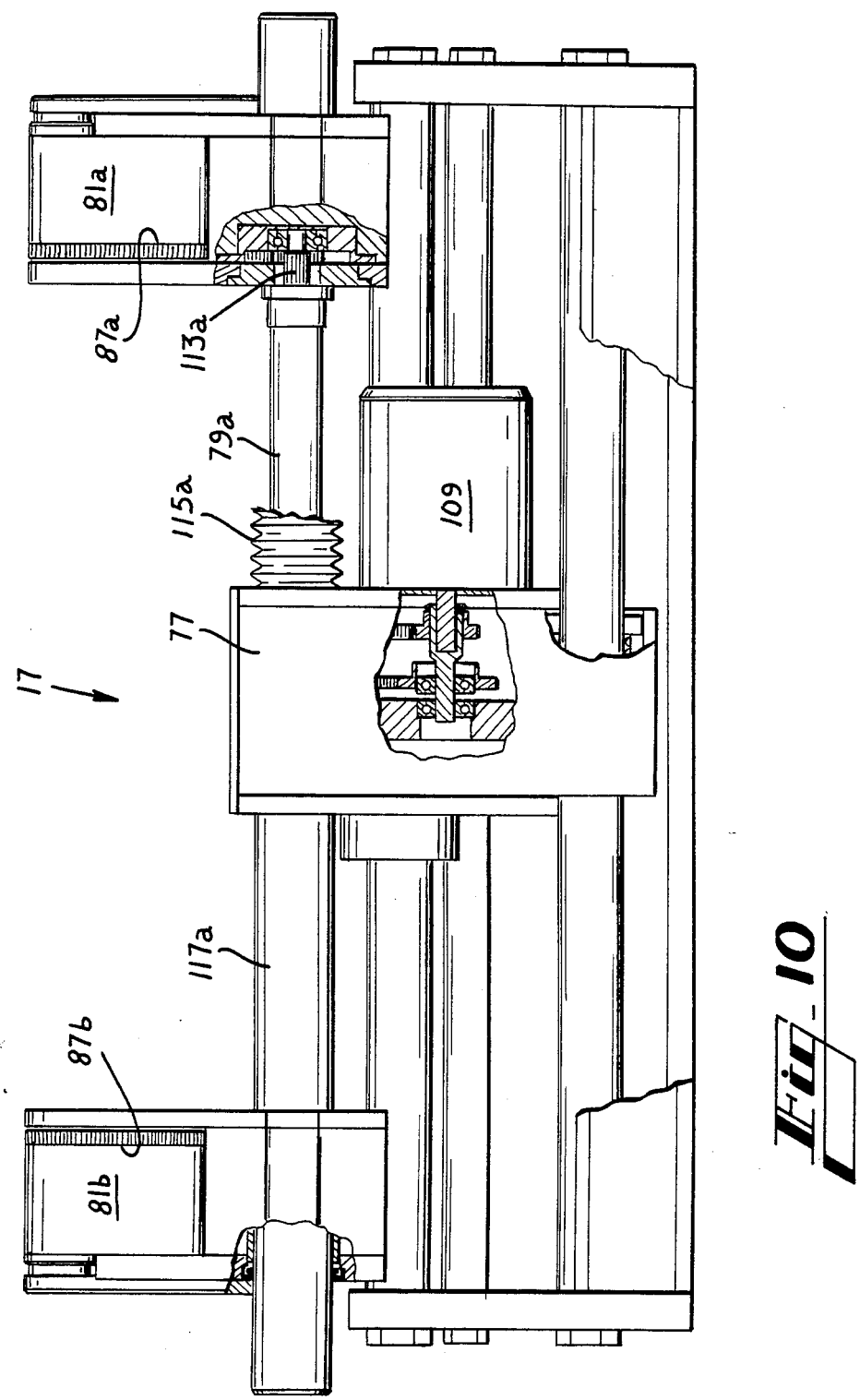

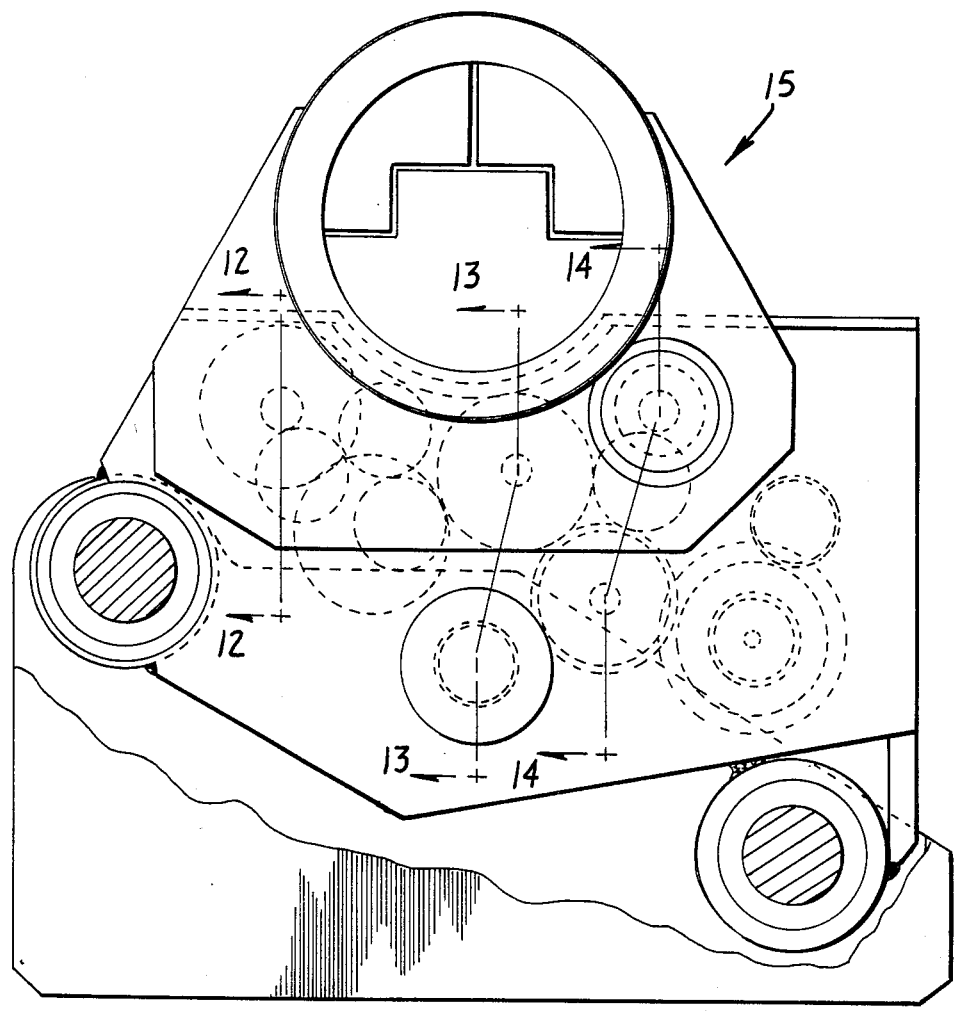
Fig_11

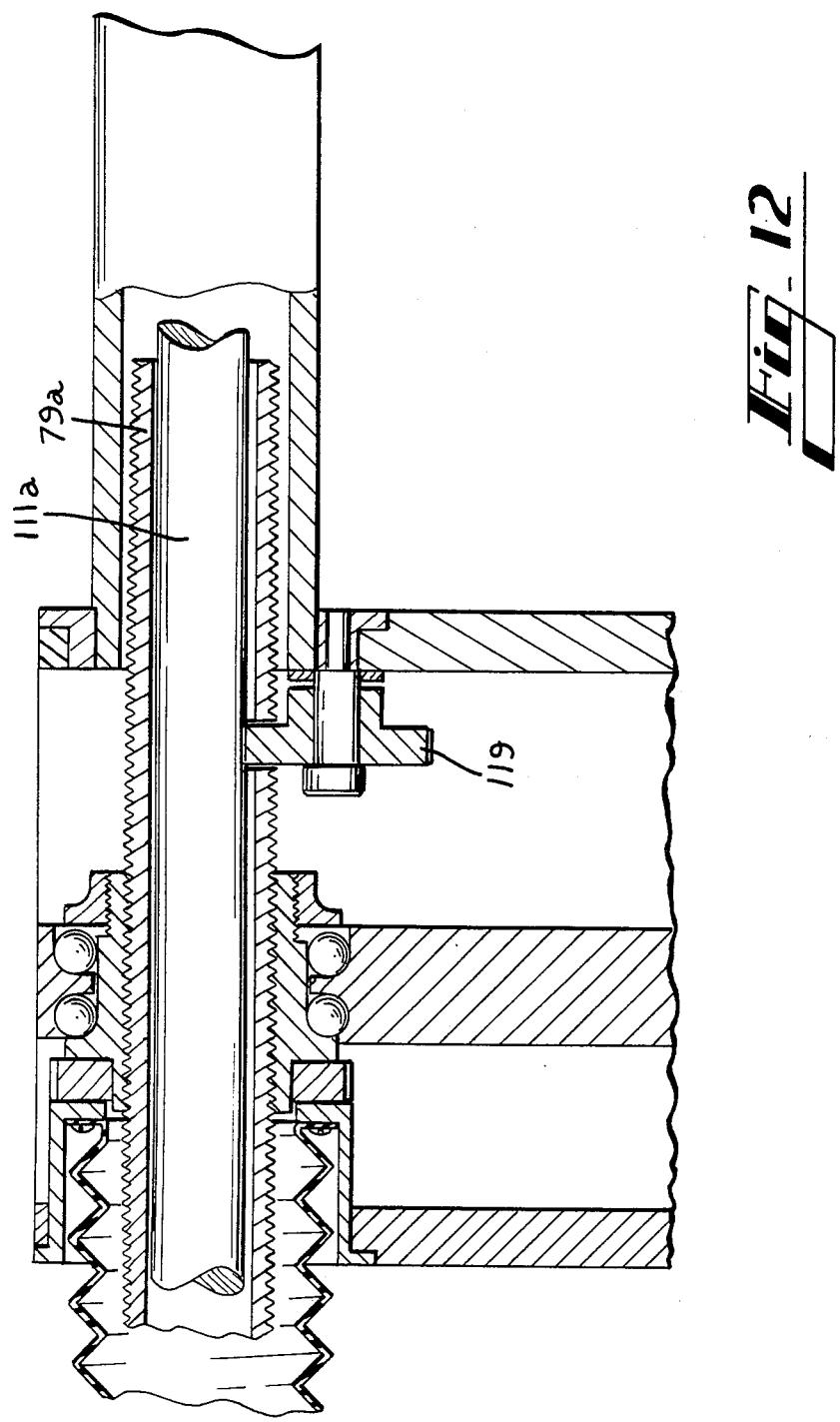

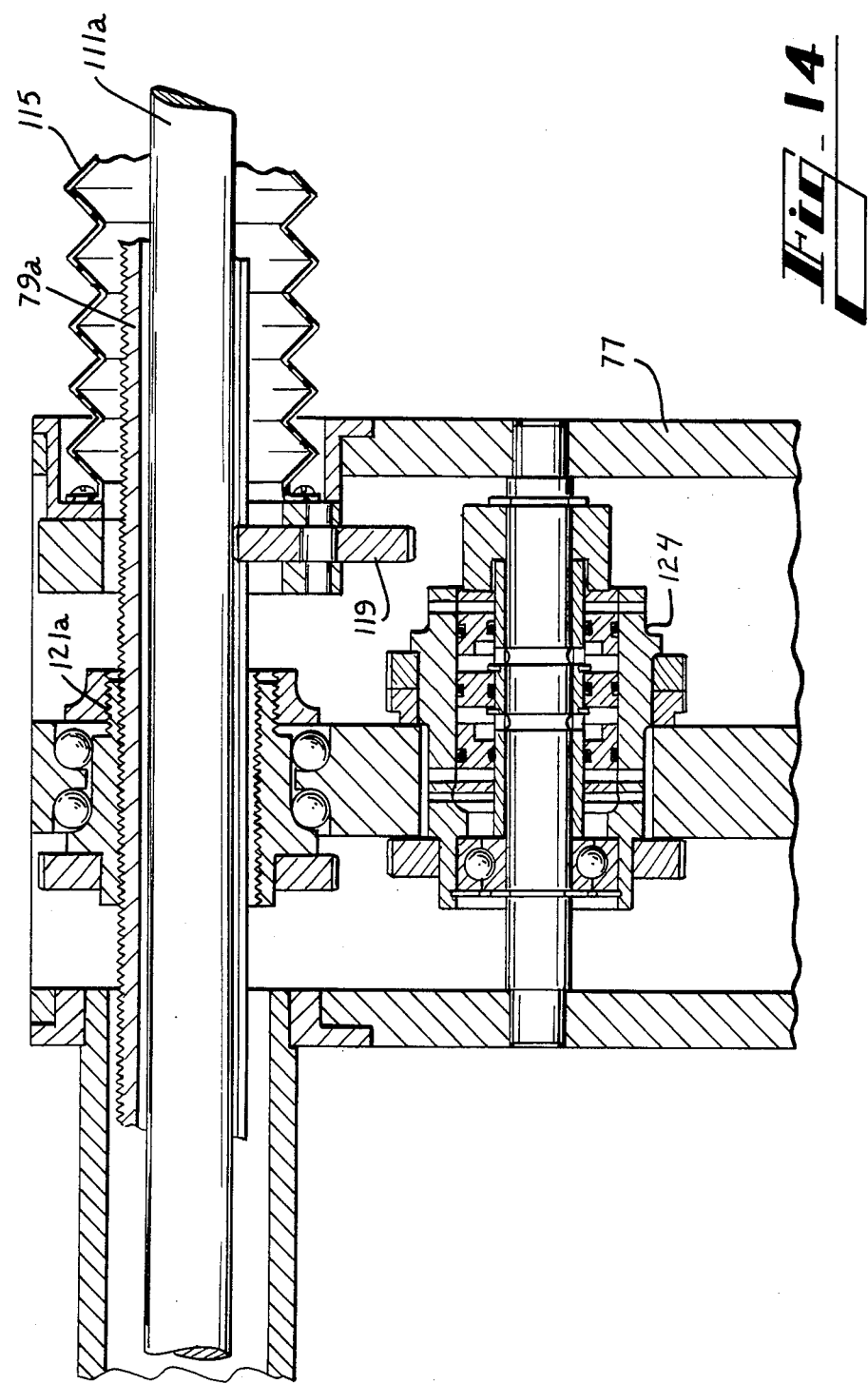

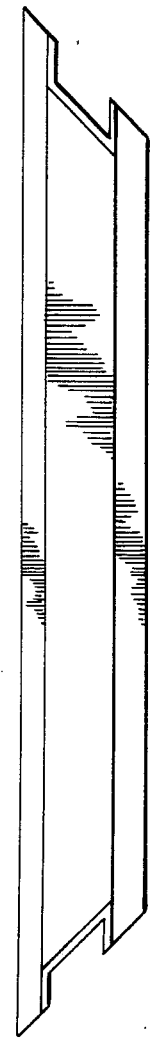
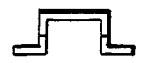
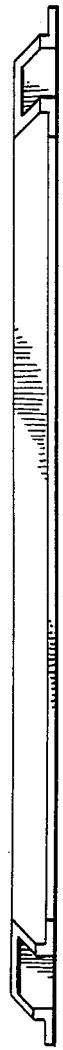
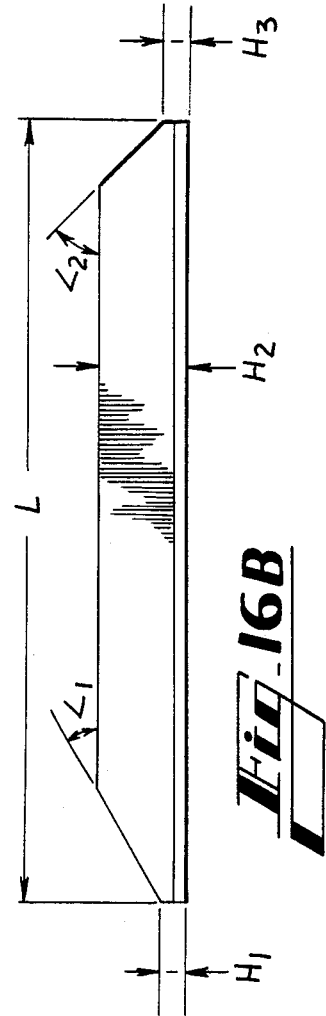
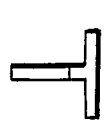

4,574,670

MULTIPLE ANGLE CUTTING APPARATUS

TECHNICAL FIELD

This invention generally relates to an apparatus for end cutting and shaping of elongated extrusions or workpieces, and more particularly to an ending cutting apparatus in which orientation between a cutting means and an end of a workpiece is adjusted or varied with respect to up to 10 independent degrees of relative motion.

BACKGROUND ART

Heretofore, the cutting of miter ended, extruded parts required the use of several machines with multiple set-ups and operations. In the case of complex, or mult-metered end workpiece, the first operation usually consists of cutting stock length extrusions into workpiece lengths with excess on both ends by a typical radial or power hack saw. These workpieces of excess length are then individually processed for cutting net miter angles by sawing, routing, milling or the like. An operator must set-up each miter/extrusion relationship with most cutting, except milling, being hand held by the operator, which in turn relies on the skill of the individual operator for safety, accuracy and rate of piece output.

The tooling associated with such operations depends on the part complexity and ranges from simple shop-aids (usually operator furnished) to multiple tool familes for an individual finished part. For parts with no holding tools, the operations required on a part frequently include, singularly or in any combination thereof, "hand lay-out", "scribe for trim" (per blueprint or sample part), "rough saw trim" and "sand to scribe line."

Regardless of whether the final part is relatively simple or complex, the prior art accomplishment of finished parts is substantially expensive when considering either or both the quantity of manual handling and the use of extra extrusion material involved in the final cutting or machining of excess length ends to net finished part lengths.

DISCLOSURE OF INVENTION

This invention discloses a sawing or cutting machine in which the relationship between a cutting member and a workpiece end is selectively variable or adjustable in up to 10 degrees or axes of relative motion.

All such relative motions are controllable by the machine whereby a common center-of-cutting-point between the cutting member and the workpiece is established and is maintained regardless of the amount of direction of relative motion change. This feature permits the forming of miter ends of workpieces on a net-to-print basis with a minimal quantity of set-ups and without need for excess workpiece lengths to begin with, regardless of the degree of complexity of the finished workpiece end.

The cutting of parts made from extrusions or rolled shapes such as tubing, tees, channels, cruciform, zees or the like, is performed by the present invention to net length and can include cutting of various angles on either end of the cut piece. This is accomplished by means of an apparatus containing an intersection of functional axes at a common "point of cut." Thus, any change in the cutting disk angle will always result in a cutting member travel path which passes through this common "point of cut." As defined by the present invention, the "point of cut" is established at the point of coincidence for the longitudinal center line of the stock to be cut, the center of longitudinal rotation of the stock, the center of vertical pivot of the cutting member, the center of horizontal pivot of the cutting member and the vertical-tiltable travel path of the cutting member.

The features of the compound angle disk cutting apparatus of the present invention include: (1) material feeding, retraction and clamping for correct length positioning of the stock; (2) material rotation for proper cross section orientation; (3) cutting member orientation in two planes for proper angle orientation; (4) controllable feed speed of the cutting member for most efficient cutting conditions; (5) cutting feed of two axes, simultaneously or singularly or sequentially; (6) clamping of the "cut off" workpiece; (7) material rotation of the cutpiece to provide proper cross section orientation for secondary cuts; (8) end swapping rotation of the cutpiece to present either end of the cutpiece for recutting; (9) cutpiece travel independent of the stock feed or retraction; and (10) the versatility of the apparatus by utilizing various cutting methods such as circular saw blades, abrasive cut-off disks and electrolytic cut-off disks to provide burr free edges.

Using the apparatus of the present invention deletes many subsequent operations normally associated with producing parts of the type concerned here. Cost reductions include such deleted operations as: (1) machining ends to net length: (2) machining miter cuts on each flange of one end: (3) machining miter cuts on each flange of opposite end; and (4) deburring of all cut edges.

In accordance with these and other objects, features, and advantages of the present invention there is provided a compound angle disk cutting apparatus comprising a stock feed and orienting mechanism for feeding and rotating stock to be cut, a cutpiece handling mechanism for manipulating a workpiece cut from the stock, a cutting member, and a cutting member positioning mechanism for orienting and moving the cutting member to provide cutting member orientation in two planes for proper angle orientation so that any engagement of the cutting member with a workpiece has a common center point of cut, the center point of cut being defined as the point of coincidence for the longitudinal axis of rotation of the stock, the center of vertical pivot of the cutting member, the center of horizontal pivot of the cutting member, and the vertical tiltable travel path of the cutting member.

In accordance with the present invention, the stock feed and orienting mechanism includes a stock feed and retraction means for presenting a length of stock to the cutting member for providing a workpiece cut to net length: clamping means for clamping the stock to the stock feed and retraction means such that the longitudinal axis or center line of the stock passes through the point of cut: and stock rotation means for proper cross section orientation of the stock to the cutting member, the stock rotation means having an axis of rotation which passes through the point of cut.

Further in accordance with the present invention, the cut piece handling mechanism comprises a cut piece feed and retraction mechanism for presenting the cut piece to the cutting member; cut piece clamping means for clamping the cut piece to the cut piece feed and retraction mechanism such that the longitudinal center line of the cut piece passes through the point of cut; an adjustment means for adjusting the cut piece clamping means for accommodating varying lengths of cut pieces; a first cut piece rotation means for proper cross section orientation of the cut piece to the cutting member, the cut piece rotation means having an axis of rotation which passes through said point of cut; and a second cut piece rotation means for end swapping rotation of the cut piece for presenting either end of the cut piece to the cutting member.

The cutting member positioning means comprises a vertical pivot means for pivoting the cutting member about a vertical axis which passes through the point of cut; a horizontal pivot means for pivoting the cutting member about a horizontal axis which passes through the point of cut; vertical positioning means for varying the vertical position of the cutting member along a travel path; and a horizontal positioning means for varying the horizontal position of the cutting member along a travel path.

DESCRIPTION OF THE DRAWINGS

FIG. 1 is an overall perspective view of the compound angle disk cutting apparatus of the present invention;

FIG. 2 is a schematic illustration depicting the nine degrees of relative motion offered by one embodiment of the present invention;

FIG. 3 is a schematic illustration depicting the 10 degrees of relative motion offered by another embodiment of the present invention;

FIG. 4 is a planar, side view, partially in section of the stock feed and orienting mechanism of the present invention;

FIG. 7 is a perspective view of another embodiment of the cutpiece handling mechanism of the present invention;

FIG. 8 is a perspective view of the nine axes cutpiece handling mechanism illustrating the cutpiece end swapping means of the present invention;

FIG. 9 is a perspective view of the ten axes cutpiece handling mechanism illustrating the cutpiece end swapping means of the present invention;

FIG. 10 is planar side view, partially in section, of the cut piece handling mechanism;

FIG. 11 is a front planar view of the cut piece handling mechanism;

FIG. 12 is a sectional view. taken along line 12—12 of FIG. 11;

FIG. 14 is a sectional view taken along line 14—14 of FIG. 11;

FIGS. 15A–15C are planar views of a finished workpiece produced in accordance with the present invention; and FIGS. 16A–16B are planar views of a tee cross section workpiece produced in accordance with the present invention.

BEST MODE OF PRACTICING THE INVENTION

Figure 5:
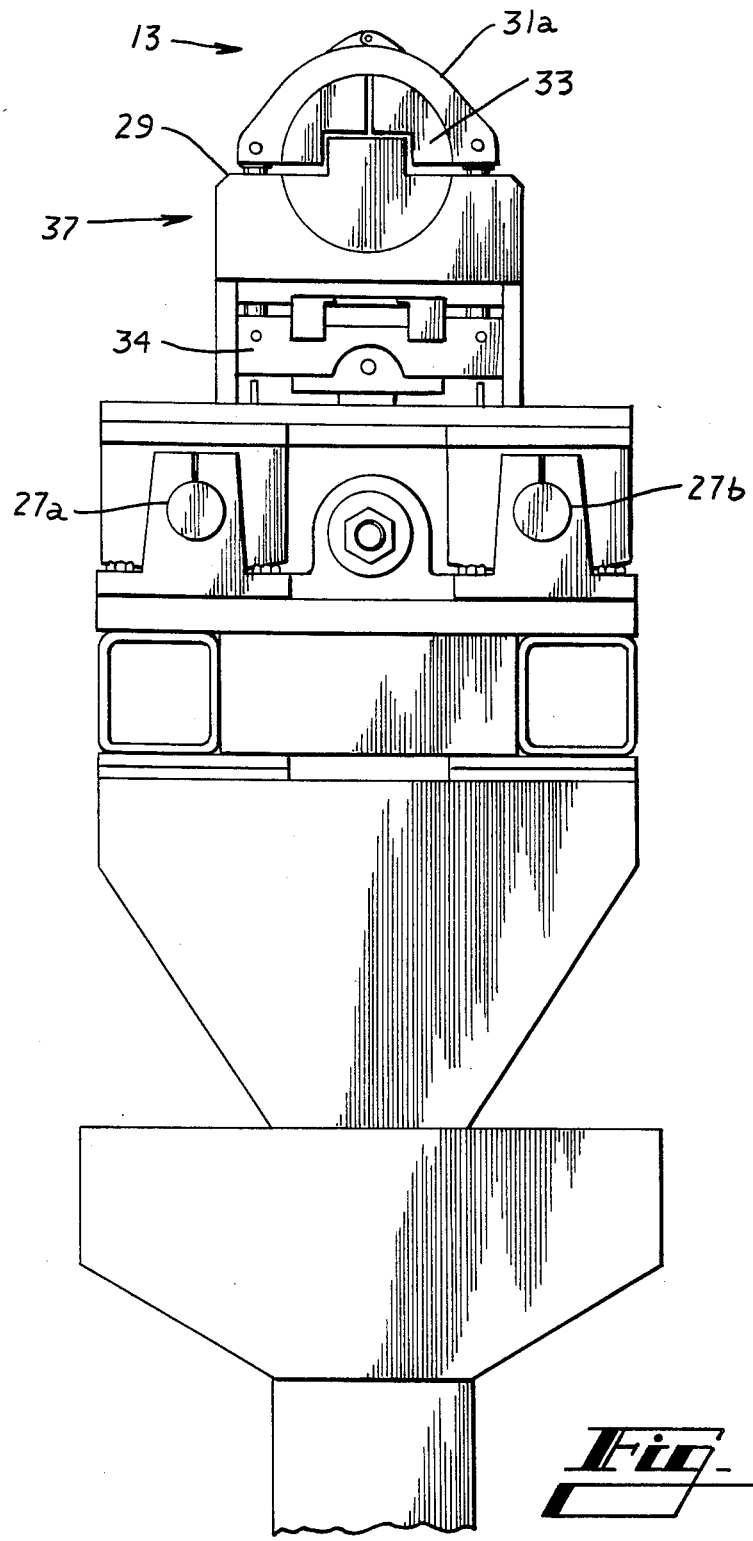
FIG. 5 is a planar, front view of the stock feed and orienting mechanism of the present invention.

Referring to FIG. 1, there is depicted in general form the layout and features of the principal items of a compound angle disk cutting apparatus 11 in accordance with the present invention, many of which will be described in more detail hereinafter. The major subassemblies or systems that are combined to comprise apparatus 11 are a stockfeed and orienting mechanism generally indicated at 13, a cut piece or workpiece handling mechanism generally indicated at 15 and a cutting member positioning mechanism generally indicated at 17 for orienting and moving cutting member 19.

In general, the relative movements and orientations of the stock feed by mechanism 13 and the cut piece handling mechanism 15 when combined with the relative movements and orientations of cutting member 19 by mechanism 17 are all such that any engagement of the cutting member 19 with a workpiece, whether from stock or a cut piece, has a common center point of cut as indicated by arrow 21 as seen in FIGS. 2 and 3. The term "point of cut" is defined as the point of coincidence for the center of rotation of stock, the center of vertical pivot of the cutting member positioning mechanism 17, the center of horizontal pivot of the cutting member positioning mechanism 17 and the vertical and/or traverse travel of the cutting member 19.

Referring to FIG. 2, the nine axes or degrees of relative motion afforded by one embodiment of the present invention are illustrated schematically. As shown, axis X represents the direction of travel of stock feed and retraction to and from the point of cut 21, the positioning of axis X being such that the longitudinal center line of the extruded stock material passes through the point of cut 21 for symmetrical cross sections and parallel to the point of cut 21 for non-symmetrical cross sections. Angle A represents the stock axis of rotation about axis X as afforded by the stock feed and orienting mechanism 13, the axis of rotation of angle A passing through the point of cut 21.

Axis X′ represents the direction of travel of a cut piece to and from the cut point 21, the axis X′ being coincident with the axis X as well as being such that the longitudinal center line of the cut piece also passes through the point of cut 21 for symmetrical cross sections and parallel to the point of cut 21 for nonsymmetrical cross sections. Angle A′ represents the cut piece axis of rotation about axis X′ as afforded by cut piece handling mechanism 15, the axis of rotation of angle A′ passing through the point of cut 21. Angle C′ represents the axis of rotation of the cut piece handling mechanism 15 about the vertical center line of mechanism 15, the angle C′ facilitating end swapping of the cut piece so that either end thereof can be presented to the cutting member 19.

Axis Y represents the horizontal direction of travel of the cutting member 19, towards and away from a workpiece, whether stock or a cut piece, axis Y being rotatable by the positioning mechanism 17 so as to form angle C. Axis Z represents the vertical direction of travel of the cutting member 19 towards and away from the workpiece, axis Z being rotatable by the positioning mechanism 17 so as to form angle B. Angle C represents the cutting member positioning mechanism 17 pivot point about a vertical center line which passes through the point of cut 21. Angle B represents the cutting member positioning mechanism 17 pivot about a horizontal center line which passes through the point of cut 21. The configuration of the nine axes or degrees of relative motion afforded by this embodiment are such that any change in the cutting member positioning mechanism angle or workpiece positioning is such that the cutting member travel path always passes through the point of cut 21.

FIG. 3 illustrates yet another embodiment of the present invention wherein 10 axes or degrees of relative motion are afforded by the apparatus 11. The tenth degree of relative motion, in addition to the nine discussed above, is angle Z' which affords the rotation of cut piece handling mechanism 15 about an axis perpendicular to angles A and B, angle Z' having a center of rotation that extends vertically through the point of cut 21. Angle Z' adds or substracts to or from the angle C and provides increased angular adjustments of the cutting member 19 on the cut piece. This permits smaller or larger angles in addition to the ±45° capability of the cutting member positioning mechanism 17.

Referring to FIGS. 1, 4 and 5, the stock feed and orienting mechanism 13 will be described, mechanism 13 being provided to feed stock, to be cut to net length, to the cutting member 19. Mechanism 13 includes a stock feed and retraction means 23 comprising a movable table 25 slidably mounted on rails 27A, 27B, the positioning of table 25 being controlled by means of a servomotor and threaded shaft arrangement (not shown) or the like.

Affixed to the top planar surface of the movable table 25 is a clamping means 29 for clamping the stock material to the stock feed and orienting mechanism 13 such that the longitudinal center line of the stock material extends along axis X so as to pass through the point of cut 21. Clamping means 29 comprises a pair of rotatable collets 31A, 31B, each having a split insert 33 adapted to match the external form of the stock material. The inserts are affixed to collets 31 and opened and closed by means of tapered slides moved by an air cylinder and piston arrangement 34 operatively associated with the pair of collets 31A, 31B as best seen in FIGS. 4 and 5.

Collet support 35 provides for retention, guiding and rotation of rotatable collets 31 by means of stock rotation means generally indicated at 37. The stock rotation means 37 provides for proper cross section orientation of the stock material to cutting member 19, and has an axis of rotation coincident with axis X so that the axis of rotation of angle A passes through the point of cut 21. Rotation of collets 31A, 31B is facilitated by means of an idler wheel (not shown) adapted to be driven and engage one of the collets 31 rotatably mounted to support 35.

Referring again to FIG. 1, the cutting member positioning mechanism 17 comprises a support, generally indicated at 39, for selectively positioning cutting member 19 with respect to a workpiece. Support 39 is adapted to carry motor 41 and drive train 43 for rotatably driving cutting member 19 at a fixed or variable speed. Horizontal movement of the cutting member 19 along axis Y is facilitated by horizontal hydraulic cylinder 45 while vertical movement of the cutting member 19 along axis Z is facilitated by vertical hydraulic cylinder 47.

The angular orientation of the cutting member 19 is also selectably controllable. Motor 48 is adapted to engage tract 49 so as to rotate cutting member 19 to a selected angle B, the pivot point of such rotation being about a horizontal center line which passes through point of cut 21. Motor 51 is adapted to engage track 53 so as to rotate cutting member 19 to a selected angle C, such rotation being about a vertical center line which passes thorugh point of cut 21.

Figure 6:
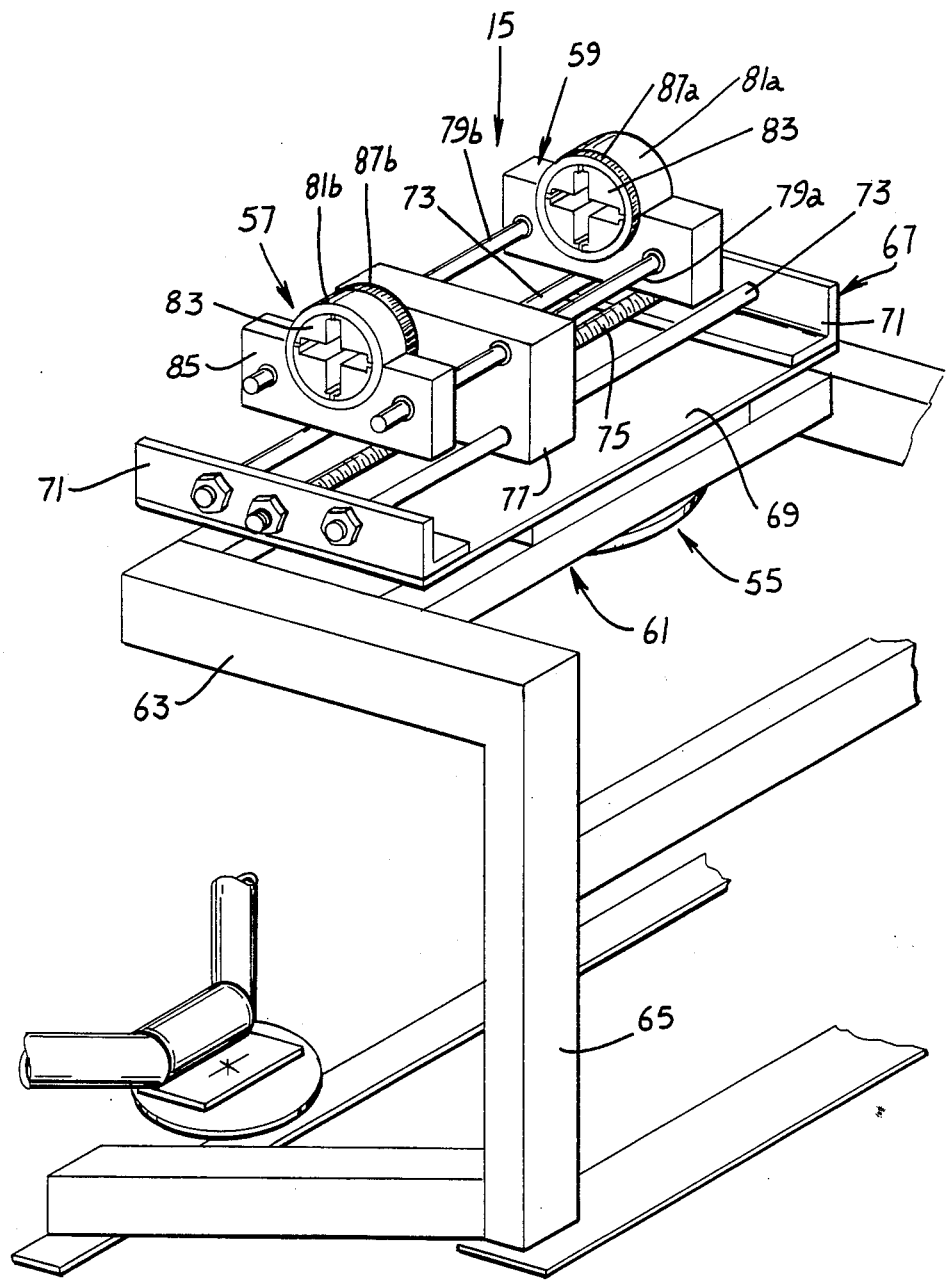
FIG. 6 is a perspective view illustrating one embodiment of the cutpiece handling mechanism of the present invention.

Referring to FIGS. 6 and 8, one embodiment of the cut piece handling mechanism is illustrated. The mechanism 15 includes a cut piece feed and retraction means, generally indicated at 55, for presenting a cut piece to the cutting member 21 and a cut piece clamping means, generally indicated at 57, for clamping a cut piece to the cut piece feed and retraction means 55. Mechanism 15 also comprises a first cut piece rotation means. generally indicated at 59, for proper cross section orientation of a cut piece with respect to the cutting member 19 as well as a second cut piece rotation means, generally indicated at 61, for end swapping rotation of a cut piece for presenting either end of the cut piece to the cutting member 19.

The cut piece feed and retraction means 55 is rotatably mounted to the upper planar surface of support 63, support 63 having a cantalever base frame 65 which establishes the dimensional coordination between mechanism 15 and the compound angle disk cutting apparatus 11. As illustrated, means 55 includes a carriage, generally indicated at 67, carriage 67 comprising a base 69 and a pair of end pieces 71. A pair of ways 73 and a fixed screw 75 are supported by and extend between end pieces 71.

Slidably mounted on ways 73 is a transmission 77 for selectively moving means 55 along the X' axis. Transmission 77 is moved along the X' axis by means of fixed screw 75 which extends through transmission 77 and is selectively engaged thereby.

Attached to transmission 77 by hollow, slotted feed screws 79A, 79B is the cut piece clamping means 57 comprising a pair of rotatable collets 81A, 81B, having split inserts 83 adapted to match the external form of the cut piece as well as place the longitudinal center line axis of the cut piece along the X' axis so as to pass through the point of cut 21. The split inserts 83 are opened and closed by means of an internally desired cylinder/piston which mates with inserts 83, the porting arrangement for the cylinder/piston being housed by collet supports 85 which provide retention, and guiding for hollow, slotted feed screws 79. The position of each collet support 85 is adjustable along the X' axis so that the collet supports 85 can be moved closer or further apart depending on the length of the cut piece to be handled. Also included is a quarter turn lock device (not shown) for removing and changing the inserts 83 from collets 81 to accommodate cut pieces having different extrusion configurations.

The first cut piece rotation means 59 is adapted to rotate a cut piece about an axis of rotation which is coincident with the X'-axis and passes through the point of cut 21. Rotation means 59 is provided to assure proper cross section orientation of the cut piece with respect to the cutting member 19 and comprises a pair of external ring gears 87A, 87B provided on the collets 81A, 81B, respectively, the gears 87A, 87B being driven by matching gears to provide rotation of the collets 81A, 81B as will be described in further derail hereinafter.

Referring to FIGS. 6 and 8, the second cut piece rotation means 61 comprises a shaft 89 fixedly attached to the base 69 of carriage 67 and rotatably mounted to cross beam 91 of support 63. The shaft 89 has an axis of rotation coincident with the axis of rotation of angle C', the shaft axis of rotation being equal distance from and between end pieces 71. A gear 93 of of shaft 89 engages rack 95 attach to drive system 99 comprising piston rod 97 of air cylinder 98. Thus, when drive system 99 is activated, the rotation of shaft 89 causes carriage 67 to rotate through 180° so as to present the opposite end of a cut piece to the cutting plane of cutting member 19.

Referring to FIGS. 7 and 9, an alternative embodiment of the cut piece handling mechanism 15 is illustrated which provides an additional axis of rotation about the verical axis of rotation of angle C, this additional axis of rotation, which forms angle Z, passing through point of cut 21. The additional axis of rotation permits smaller or larger angles of cut in addition to the plus or minus 45° capability of the cutting member positioning mechanism 17.

According to the embodiment of mechanism 15 illustrated by FIGS. 7 and 9, the carriage 67 is mounted on a subplate with a pair of tracks 101A, 101b, such that drive wheel 103 of motor 105 engages track 101B, motor 105 being affixed to frame 65. Referring to FIG. 9, shaft 89 passes through a slot in plate 107 such that the desired additional angle may be retained when rotated during an end swapping operation.

Referring to FIGS. 10–14, the drive system of the cut piece handling mechanism 17 will be described. As shown in FIG. 10, motor 109 transmits power to transmission 77 to rotate collets 81A, 81B via pinion gear drive shafts 111A, 111B contained within the hollow slotted feed screw 79A, 79B, respectively, as best illustrated by FIG. 12. One end of the pinion gear drive shaft 111A engages gear 113A which engages the ring gear 87A of the collet 81A. Feed screw 79A is covered by a flexible sleeve 115A along a portion thereof, the remaining portion of the feed screw 79A being contained within a hollow cylinder 117A adapted to slide through the collet 81B which is not driven by drive shaft 111A. A similar arrangement rotatably drives collet 81B. As shown by FIG. 12, drive wheel 119, positioned in the slot of feed screw 79, drives pinion gear drive shaft 111 to rotate collets 81.

Figure 13:
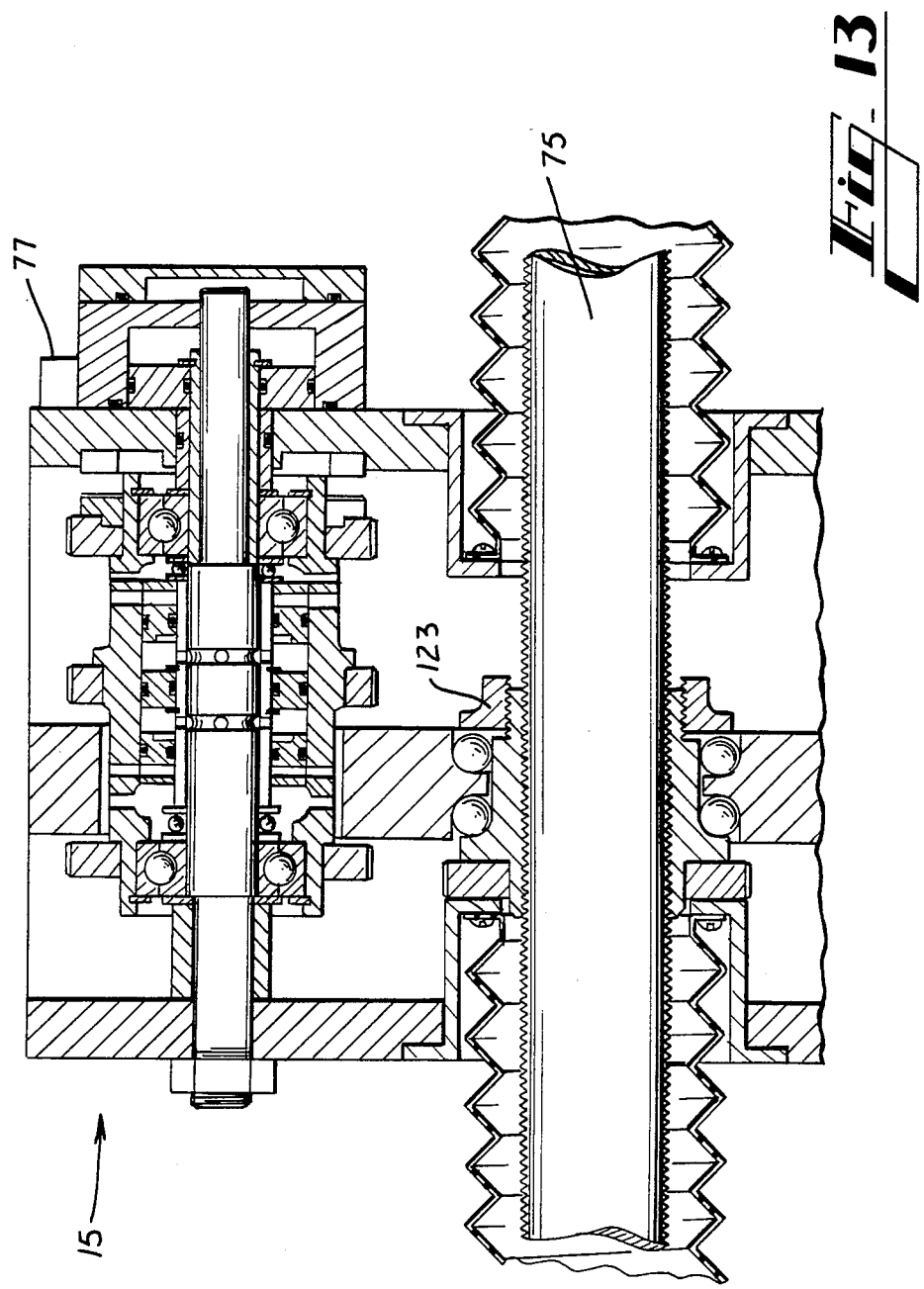
FIG. 13 is a sectional view taken along line 13—13 of FIG. 11.

Referring to FIG. 14. two geared barrel nuts 121A, 121B, rotate in opposite directions to move collets 81A, 81B closer or further apart by pushing or pulling hollow, slotted feed screws 79A, 79B through the barrel nuts 121A, 121B, respectively. Similarly, geared barrel nut 123, as seen in FIG. 13, rotates around fixed screw 75 to position the cut piece feed and retraction mechanism 15 along the X' axis. An internal transmission shifting mechanism 124, as seen in FIG. 14, provides selected gearing for rotation of collets 81, positioning of distance between collets 81 or parallel motion of the collets 81 to or away from the cut point 21.

The compound angle disk cutting apparatus 11 is adapted for use with a numerical control arrangement, wherein numerical values corresponding to the desired positions of tools and symbolic values corresponding to auxiliary functions are recorded on punched paper tape, punched cards, or magnetic tape, floppy or rigid discs or other storage media where the information can be stored indefinitely. Storage media readers convert the information into signals which operate servomechanisms on each axis of the machine whose motion is to be controlled. Alternatively, the direct coupling of a digital computer to the machine-tool control system is possible in which case the programming input will be permanently stored on board part programs available to an operator by part number selection.

In operation, a stored program is called up by entering the appropriate part number in the computer and then the operator follows the sequence of instructions provided on the viewing screen of a CRT. Thereafter, the appropriate inserts which conform to the external configuration of the stock are installed in the collets on the stock feed and orientation mechanism as well as the cut piece feed and retraction mechanism. The stock is then loaded into the stock feed and orientation mechanism and the end of the stock is index. All controls, axis locations and stops are set per CRT instructions for coordinating the physical positions to programmed zero locations and various machine commands. The operator then enters the number of parts to be cut automatically, and initiates automatic cutting by pushing the start button. The operator observes the apparatus for proper operation, off loads parts and loads additional extrusions or stock as needed.

The operation of the apparatus 11 will be described in further detail with particular reference to FIGS. 16A–16B which illustrate a tee cross section part representing a typical stiffener for an airframe. During the initial operation of the apparatus 11, the stock is clamped to the stock feed and orienting mechanism 13 and a trim cut performed to provide a square end. Thereafter, collets 31A, 31B of mechanism 13 unclamp as stockfeed and retraction means 23 moves away from the cutting plane, the tee cross section stock material remaining stationary in a fixed collet (not shown). After means 23 has moved the prescribed distance, the stock is reclamped to mechanism 13 and fed a predetermined length to present the stock material to the cutting member 19 for cutting to net length L. During cutting to net length, it is important to note, that the stock is clamped both by the stock feed and retraction means 23 as well as the cut piece handling mechanism 15.

After the stock is cut to net length, mechanism 13 retracts to clear the cutting plane for cutting adjustments and action. Thereafter, cutting member positioning mechanism 17 rotates about the C axis to programmed ∠1 to cut the stock material to the $H_1$ dimension. Thereafter, the cutting member 19 retracts and rotates angles C and B to programmed cutting plane for ∠2. Concurrently, the cut piece handling mechanism 17 rotates 180° about the C' axis to present the unmitered end of the cut piece to the cutting plane. At the same time, stock rotation means 37 rotates the cut part about the A'-axis to its programmed position if required. During this time, any repositioning along the X'-axis for programmed L length and $H_3$ height is accomplished.

After the miter cut for ∠2 to $H_3$ dimension is accomplished, the cut piece is rotated back to match the original extrusion position and the various clamping functions are performed as the finished cut part is pushed out by advancing the stock for the next part. The sequence of operations then repeat for the next part until the total quantity is cut or a short extrusion signal occurs. This too short signal notifies the operator to manually load a new extrusion or activate the accessory for automatically loading another length of extrusion.

While the invention has been particularly shown and described with reference to preferred embodiments thereof, it will be understood by those skilled in the art that various alterations in form and detail will be made therein without departing from the spirit and scope of the invention as described by the appended claims.

I claim:

1. A compound angle disk cutting apparatus comprising:
    (a) a stock feed and orienting mechanism for feeding and orienting a workpiece to be cut with respect to a point of cut;

(b) a cut piece handling mechanism for manipulating said workpiece;

(c) a cutting member capable of vertical motion along a vertical centerline which passes through said point of cut and angular motion with respect to said vertical centerline, the pivot of such motion being along a horizontal centerline which passed through said point of cut, said cutting member also being capable of transverse movement along said horizontal centerline; and (d) a cutting member positioning mechanism for moving said cutting member vertically along said vertical centerline about a pivot point located along the horizontal centerline which passes through said point of cut and transversely along said horizontal centerline whereby any engagement of said cutting member with said workpiece has a common centerpoint of cut, said point of cut being defined as the point of coincidence for the center of rotation of the workpiece, the pivot point for angular motion of said cutting member with respect to said vertical centerline and the said transverse motion of said cutting member along said horizontal centerline.

2. A compound angle disk cutting apparatus according to claim 1, wherein said stock feed and orienting mechanism comprises:

(a) a stock feed and retraction means for presenting a length of stock to said cutting member for providing a workpiece cut to net length;

(b) clamping means for clamping the stock to said stock feed and retraction means such that the longitudinal center line of the stock passes through said point of cut; and (c) stock rotation means for proper cross section and flange orientation of the stock to said cutting member, said stock rotation means having an axis of rotation which passes through said point of cut.

3. A compound angle disk cutting apparatus according to claim 1, wherein said cut piece handling mechanism comprises:

(a) a cut piece feed and retraction mechanism for presenting the cut piece to said cutting member;

(b) cut piece clamping means for clamping the cut piece to said cut piece feed and retraction mechanism such that the longitudinal center line of the cut piece passes through said point of cut;

(c) first cut piece rotation means for proper cross section and flange orientation of the cut piece to said cutting member, said cut piece rotation means having an axis of rotation which passes through said point of cut; and (d) second cut piece rotation means for end swapping rotation of the cut piece for presenting either end of the cut piece to said cutting member.

4. A compound angle disk cutting apparatus according to claim 1, wherein said cutting member positioning mechanism comprises:

(a) vertical pivot means for pivoting said cutting member about a vertical axis which passes through said point of cut;

(b) horizontal pivot means for pivoting said cutting member about a horizontal axis which passes through said point of cut;

(c) vertical positioning means for varying the vertical position of said cutting member along a travel path; and (d) horizontal positioning means for varying the horizontal position of said cutting member along a travel path.

5. The compound angle cutting disk cutting apparatus of claim 1 further comprising control means for synchronizing the operation of said stock feeding and orienting mechanism, said cut piece handling mechanism, said cutting member positioning mechanism and said cutting member whereby said cutting apparatus receives a continous supply of feed stock for cutting and any engagement of said cutting member with the workpiece passes through said common centerpoint of cut.

* * * * *